(12) United States Patent
Kezar

(10) Patent No.: US 9,927,044 B2
(45) Date of Patent: Mar. 27, 2018

(54) DUAL SHAFT ALTERNATING DRIVE ACTUATOR

(71) Applicant: KMC Controls, Inc., New Paris, IN (US)

(72) Inventor: Kevin D. Kezar, New Paris, IN (US)

(73) Assignee: KMC Controls, Inc., New Paris, IN (US)

( * ) Notice: Subject to any disclaimer, the term of this patent is extended or adjusted under 35 U.S.C. 154(b) by 0 days.

(21) Appl. No.: 15/385,443

(22) Filed: Dec. 20, 2016

(65) Prior Publication Data

US 2017/0176044 A1 Jun. 22, 2017

Related U.S. Application Data

(60) Provisional application No. 62/270,183, filed on Dec. 21, 2015, provisional application No. 62/323,169, filed on Apr. 15, 2016.

(51) Int. Cl.

| F16K 31/04 | (2006.01) |
|---|---|
| F16H 19/00 | (2006.01) |
| F16H 21/44 | (2006.01) |
| F16H 37/12 | (2006.01) |

(Continued)

(52) U.S. Cl.
CPC ......... F16K 31/043 (2013.01); F16H 19/001 (2013.01); F16H 21/44 (2013.01); F16H 37/12 (2013.01); F16K 1/221 (2013.01); F16K 1/223 (2013.01); F24F 13/14 (2013.01); F24F 2013/1433 (2013.01);
(Continued)

(58) Field of Classification Search
CPC ........ F16K 31/043; F16K 1/221; F16K 1/223; F16K 5/10; F16K 11/10; F16K 11/20; F24F 13/14; F24F 2013/1433; F24F 2013/1446; F16H 37/12; F16H 19/001; F16H 21/44; Y10T 137/87981; Y10T 137/88022; Y10T 137/8803; Y10T 137/88038; Y10T 137/87515; Y10T 137/87531
USPC ........................ 251/248–249, 129.11–129.13; 137/614.11, 614.16–614.18, 601.15, 137/601.17
See application file for complete search history.

(56) References Cited

U.S. PATENT DOCUMENTS

| 2,349,727 A | * | 5/1944 | Hopkins | ................. F16K 1/221 |
| | | | | 137/552 |
| 3,070,345 A | | 12/1962 | Knecht | |
| 3,633,626 A | | 1/1972 | Zirps | |

(Continued)

*Primary Examiner* — John Bastianelli
(74) *Attorney, Agent, or Firm* — Shewchuk IP Services, LLC; Jeffrey D. Shewchuk

(57) ABSTRACT

An actuator provides two step control of a dual valve or dual damper, such as in an HVAC system. The gear train includes projections on top and bottom faces of the final gear, the projections being rotationally offset from each other by an angle. Each projection mates into a slot of a Geneva-gear-type output member, with two such output members accessible, one on the top of the actuator and one on the bottom of the actuator. During the portion of the throw that the upwardly facing projection is in the slot of the upwardly exposed Geneva-type output gear, the final gear rotates the upper output member to control one flow blockage member in the valve or damper. During another portion of the throw, rotation of the final gear does not rotate the upper output member, but instead rotates the lower output member and its flow blockage member.

18 Claims, 10 Drawing Sheets

(51) Int. Cl.
*F16K 1/22* (2006.01)
*F24F 13/14* (2006.01)

(52) U.S. Cl.
CPC .............. *F24F 2013/1446* (2013.01); *Y10T 137/87531* (2015.04); *Y10T 137/8803* (2015.04)

(56) References Cited

U.S. PATENT DOCUMENTS

| | | | | |
|---|---|---|---|---|
| 3,860,032 | A * | 1/1975 | Rogers | F16K 5/0605 137/614.17 |
| 3,870,274 | A * | 3/1975 | Broe | F16K 31/04 251/129.12 |
| 3,934,851 | A | 1/1976 | Illing | |
| 4,370,631 | A * | 1/1983 | Gerber | H01P 1/10 251/129.13 |
| 4,533,800 | A * | 8/1985 | Parsons | H01H 3/16 200/47 |
| 5,168,900 | A | 12/1992 | Johnson | |
| 5,169,121 | A * | 12/1992 | Blanco | F24F 13/1426 251/305 |
| 5,647,399 | A | 7/1997 | Andersen | |
| 5,674,125 | A * | 10/1997 | Xia | F16K 1/223 454/327 |
| 5,747,760 | A | 5/1998 | Skarivoda | |
| 5,794,647 | A | 8/1998 | Denmark et al. | |
| 6,186,169 | B1 * | 2/2001 | McHugh | A62C 35/60 137/559 |
| 6,484,755 | B1 | 11/2002 | Schwarz | |
| 6,568,417 | B2 | 5/2003 | Laney | |
| 7,140,392 | B2 | 11/2006 | Blomquist et al. | |
| 7,188,481 | B2 * | 3/2007 | DeYoe | F24F 13/1426 236/49.3 |
| 7,267,139 | B2 | 9/2007 | Blomquist et al. | |
| 7,455,076 | B2 * | 11/2008 | Kwon | F16K 3/32 137/487.5 |
| 7,658,671 | B2 | 2/2010 | Balzo et al. | |
| 8,342,206 | B2 * | 1/2013 | Gierszewski | F02D 9/1055 137/601.16 |
| 8,398,468 | B2 | 3/2013 | Kim | |
| 8,640,565 | B2 * | 2/2014 | Liu | F16H 37/124 251/129.11 |
| 8,789,807 | B2 | 7/2014 | Kreuter | |
| 9,276,449 | B2 | 3/2016 | Kezar | |
| 9,404,594 | B2 | 8/2016 | Morein | |
| 2003/0089871 | A1 * | 5/2003 | Hashimoto | F16K 31/047 251/129.11 |
| 2016/0138821 | A1 | 5/2016 | Shaull et al. | |

* cited by examiner

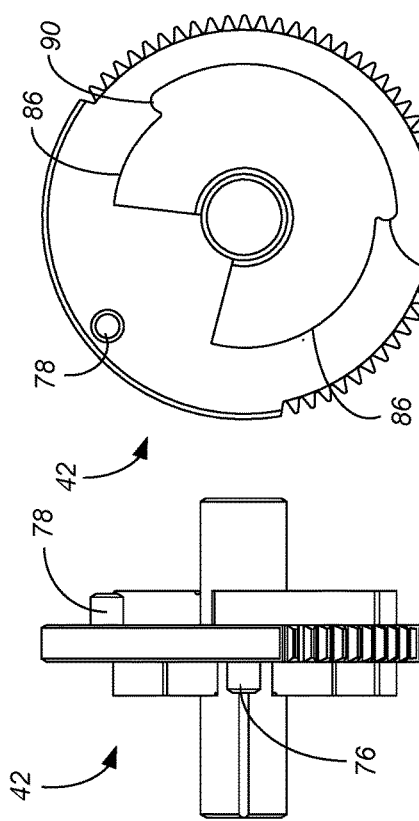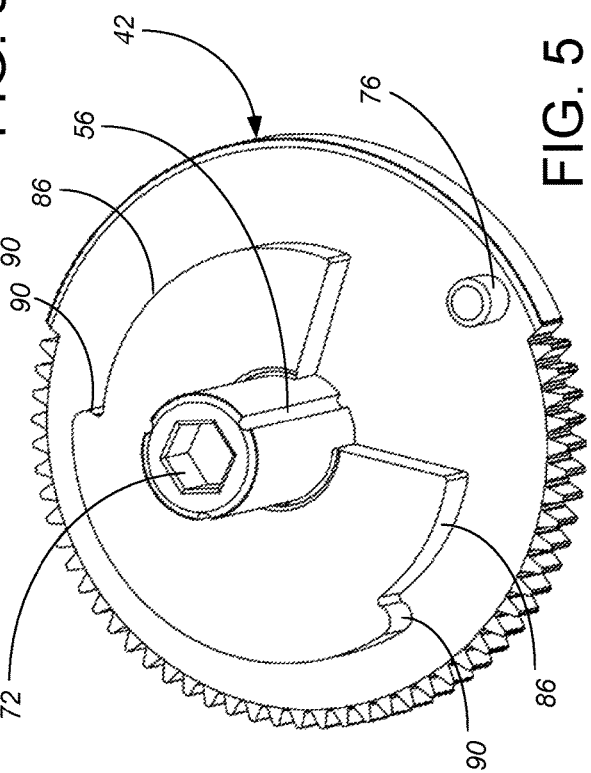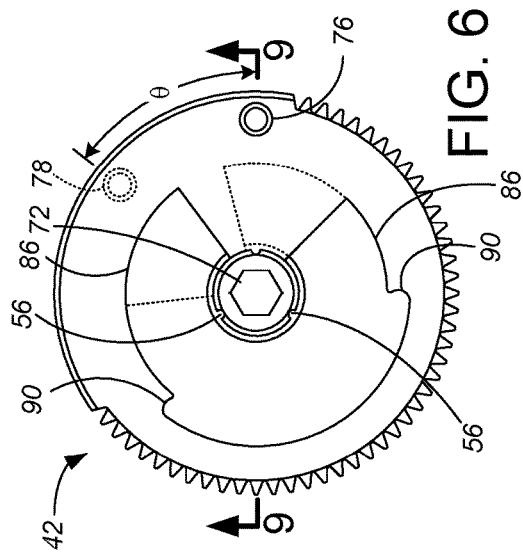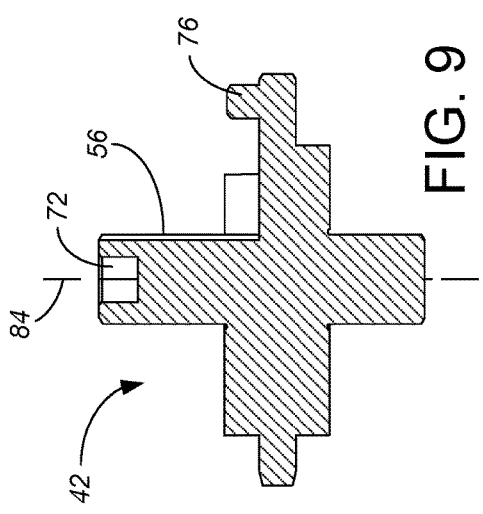

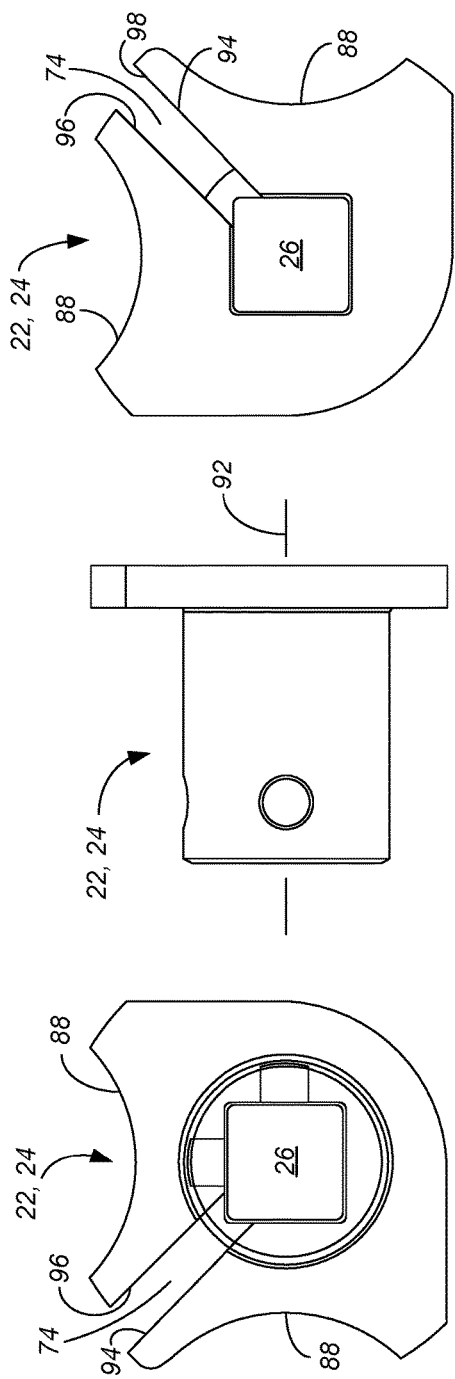
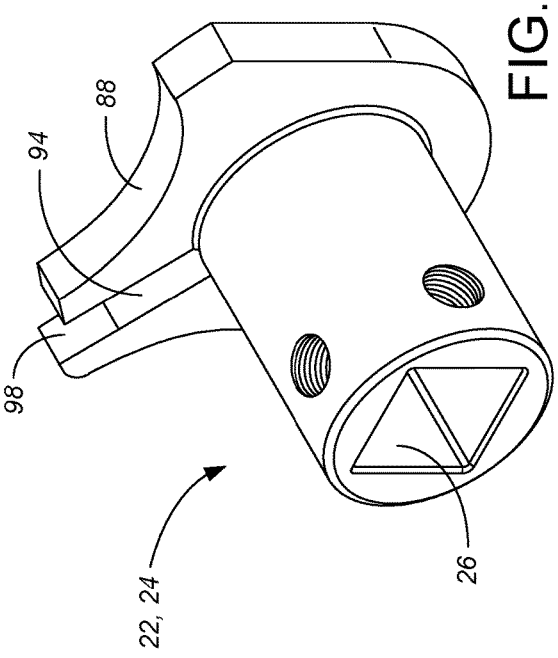

DUAL SHAFT ALTERNATING DRIVE ACTUATOR

CROSS-REFERENCE TO RELATED APPLICATION(S)

This application claims priority from U.S. Provisional Patent App. No. 62/270,183, filed Dec. 21, 2015, and from U.S. Provisional Patent App. No. 62/323,169, filed Apr. 15, 2016. The contents of U.S. Provisional Patent App. No. 62/270,183 and U.S. Provisional Patent App. No. 62/323, 169 are incorporated herein by reference, in their entirety.

BACKGROUND OF THE INVENTION

Actuators have long been used in heating, ventilation and air conditioning ("HVAC") system systems to control the movement or location of a flow blockage member in a damper or valve. While actuators can use pneumatic or other sources of power, most HVAC actuators include an electrically powered motor to turn a rotary output. The motor shaft is typically significantly geared down, so numerous turns of the motor shaft turn the rotary output a much smaller amount such as 90°. The rotary output is connected, typically in the field, to a drive stem or drive shaft of a damper or valve as a component of the building's HVAC system. U.S. Pat. Nos. 8,789,807 and 9,276,449, and U.S. patent application Ser. No. 14/939,577, all owned by the assignee of the present invention, are all incorporated by reference for their general teachings regarding HVAC actuators.

Some valve and damper components of HVAC and other systems for controlling fluid flow through a duct or pipe include two flow blockage members, such as two butterfly valve blockage plates. U.S. Pat. Nos. 3,070,345, 3,633,626, 3,633,626, 3,934,851, 5,168,900, 5,647,399, 5,794,647, 6,484,755, 6,568,417, 7,140,392, 7,267,139, 7,658,671, 8,342,206, 8,398,468 and 9,404,594 show such arrangements, and are all incorporated by reference for examples of environments where the present invention may be employed. In many instances, both of the flow blockage members in such dual arrangements are mounted for coaxial, rotational movement. In some instances, the control system is required to actuate the two flow blockage members entirely independently, i.e., where each of the flow blockage members can be selected and positioned at whatever percentage open or closed is desired, regardless of the position of the other flow blockage member, and without regard to which flow blockage member is opened first. In other instances, one of the two flow blockage members is always the first to begin to open (during opening from a fully closed position), while the other flow blockage member is always the first to begin to close (during closing from a fully open position).

As can be seen by a review of the patents listed above, there are many actuator structures which can be used on dual coaxially arranged flow blockage valves and dampers. Each of these prior art actuator structures has its own drawbacks, often in terms of cost or complexity, and in terms of difficulty of use and control. A simple, robust, low cost actuator design which can control dual flow blockage valves and dampers is needed.

BRIEF SUMMARY OF THE INVENTION

The present invention is an actuator for use in a controlling a dual valve or dual damper, such as in an HVAC system, in a two step control. The final gear of the gear train includes a projection on one of its faces, and preferably projections on both opposing faces. The projection(s) mate into a slot of the output members during part of the final gear rotation. During the portion of the throw that the projection is in the slot, the final gear rotates the first output member. During another portion of the throw that the first projection is not in the first output slot, rotation of the final gear does not rotate the first output member, but instead rotates a second output member. In the preferred embodiment, the first and second output members are coaxially mounted, one accessible on a top side of the actuator and the other accessible on the bottom side of the actuator.

BRIEF DESCRIPTION OF THE DRAWINGS

FIG. 5 is a perspective view of the first preferred final drive gear.

FIG. 6 is a top plan view of the first preferred final drive gear of FIG. 5, with dashed lines indicating the relative location of the drive peg and curved mating surface on the bottom face of the final drive gear.

FIG. 7 is a side view of the final drive gear of FIGS. 5 and 6.

FIG. 8 is a bottom plan view of the final drive gear of FIGS. 5-7.

FIG. 9 is a cross-sectional view of the final drive gear of FIGS. 5-8, taken along lines 9-9.

FIG. 10 is a perspective view of a first preferred embodiment of one of the Geneva drives. Both of the Geneva drives may be made with the identical part.

FIG. 11 is a top plan view of the first preferred Geneva drive of FIG. 10, with dashed lines showing the tapped holes used to receive set screws for attachment of a rotation drive shaft for one of the flow blockage members.

FIG. 12 is a side view of the preferred Geneva drive of FIGS. 10 and 11.

FIG. 13 is a bottom plan view of the preferred Geneva drive of FIGS. 10-12.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
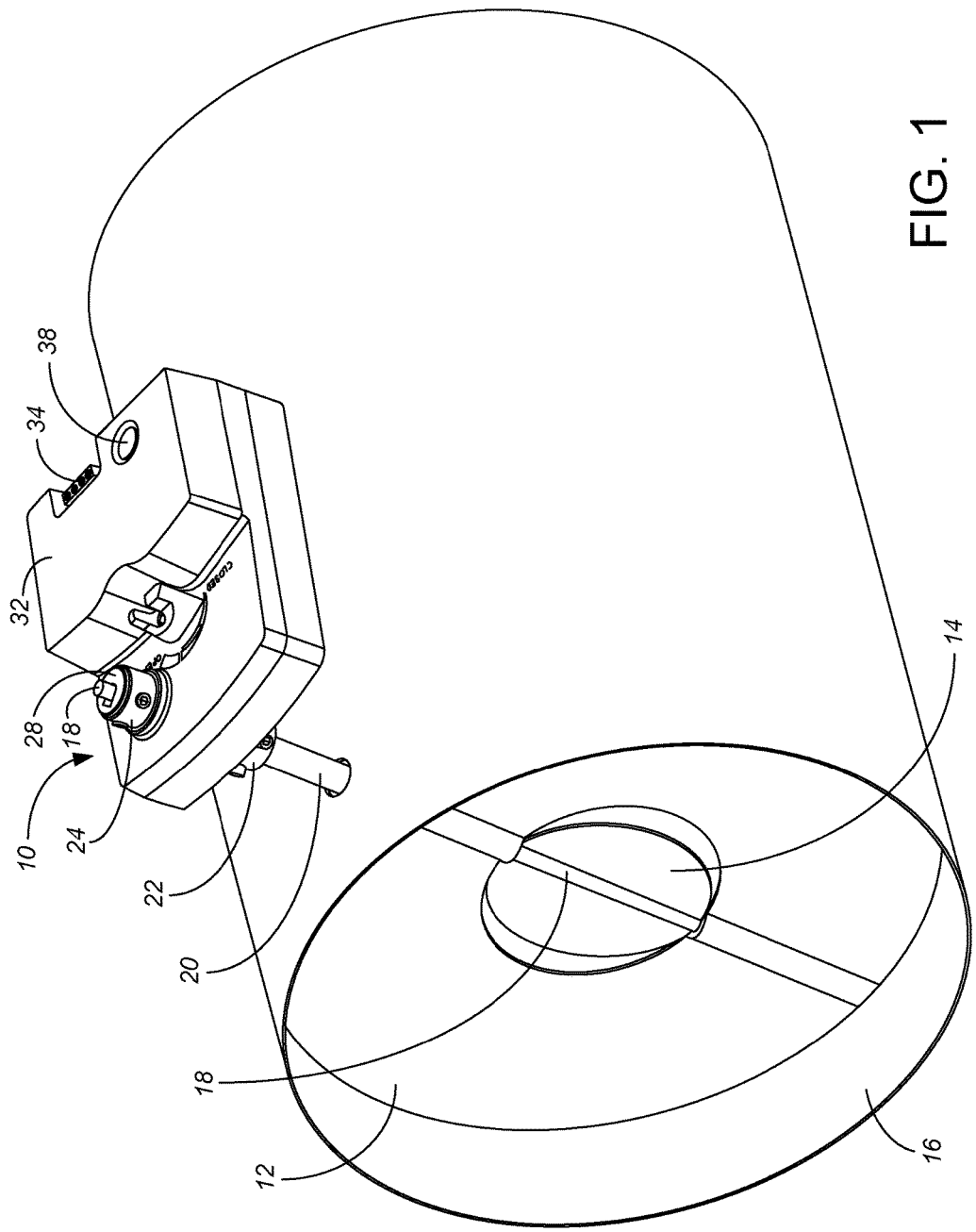
FIG. 1 is a perspective view depicting dual damper flow control members inside a cylindrical duct, driven by a preferred actuator of the present invention.

The dual-shaft actuator 10 of the present invention is used such as shown in FIG. 1, to enable better flow control using two dampers 12, 14 inside the duct 16. This embodiment includes a large damper 12 and a small damper 14 in a center opening of the larger damper 12, both co-axially mounted. A drive shaft 18 that controls the smaller damper 14 is located coaxially inside a drive shaft 20 that controls the larger damper 12, i.e., the drive shaft 20 for the larger damper 12 provides a rotational sleeve around the smaller damper drive shaft 18. The design of the present invention allows a single actuator 10 to drive and control the movement of the two dampers 12, 14 in a two step control, eliminating the need to have two actuators. In FIG. 1, the smaller damper 14 is shown being slightly opened by the preferred actuator 10, while the larger damper 12 is being held fully closed.

The arrangement shown in FIG. 1 represents just one type of damper that includes two flow blockage members to control fluid flow therethrough. As shown in U.S. Pat. Nos. 3,070,345, 3,633,626, 3,633,626, 3,934,851, 5,168,900, 5,647,399, 5,794,647, 6,484,755, 6,568,417, 7,140,392, 7,267,139, 7,658,671, 8,342,206, 8,398,468 and 9,404,594, there are many alternative valve and damper arrangements that include two flow blockage members to control fluid flow therethrough. The dual drive actuator 10 of the present invention is useful in all these alternative valve and damper arrangements.

In the preferred embodiment, the outputs 22, 24 of the actuator 10 are coaxially arranged, one accessible on the top and the other on the bottom of the actuator 10. At least the lower output 22 includes an axial through-bore 26, such that the inner drive shaft 18 of the smaller damper plate 14 can extend through the lower output 22 to be secured to the upper output 24. While top/bottom coaxial arrangements are readily applicable to the dual plate damper shown in FIG. 1, alternative output arrangements include having both outputs on the same side of the actuator 10. As better shown in FIGS. 10, 11 and 13, the outputs 22, 24 of the preferred embodiment include a female recess or through-bore 26 designed to receive a ½ inch square shaft drive of a damper or valve, which can also receive a ½ inch diameter round shaft. If desired to properly mate with the damper or valve drive stem being used, an inner connector (adapter) 28 can be positioned inside the recess 26 to provide a blade drive and/or connection for a ¼ inch diameter round drive shaft. While the two shafts 18, 20 of the flow control plates 14, 12 can thus be readily secured to the respective actuator outputs 22, 24 using simple set screws 30 best shown in FIG. 2, many alternative linkages could be used.

Further, both outputs 22, 24 have a 90° rotational stroke length from a fully closed terminal position to a fully opened terminal position. While such stroke length is readily applicable to the damper shown in FIG. 1 to move each plate 12, 14 from a fully closed to a fully opened position (and/or vice versa), additional gearing (not shown) off of either of the outputs 22, 24 could be used to vary the relative amount of movement, relative amount of power, or axis location of one of the outputs relative to the other output.

Figure 2:
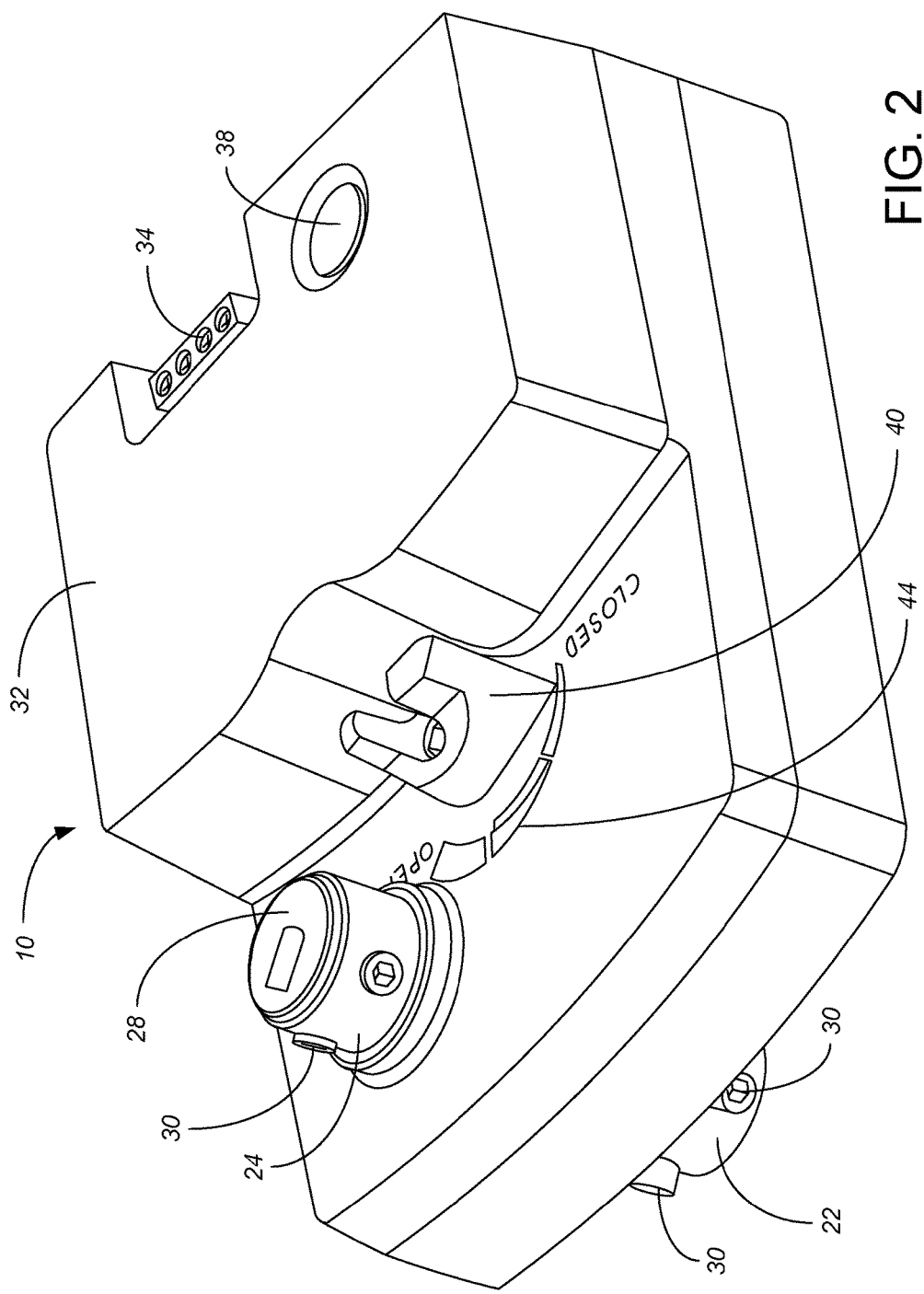
FIG. 2 is a first perspective view of the preferred actuator of FIG. 1 within its enclosure.
Figure 3:
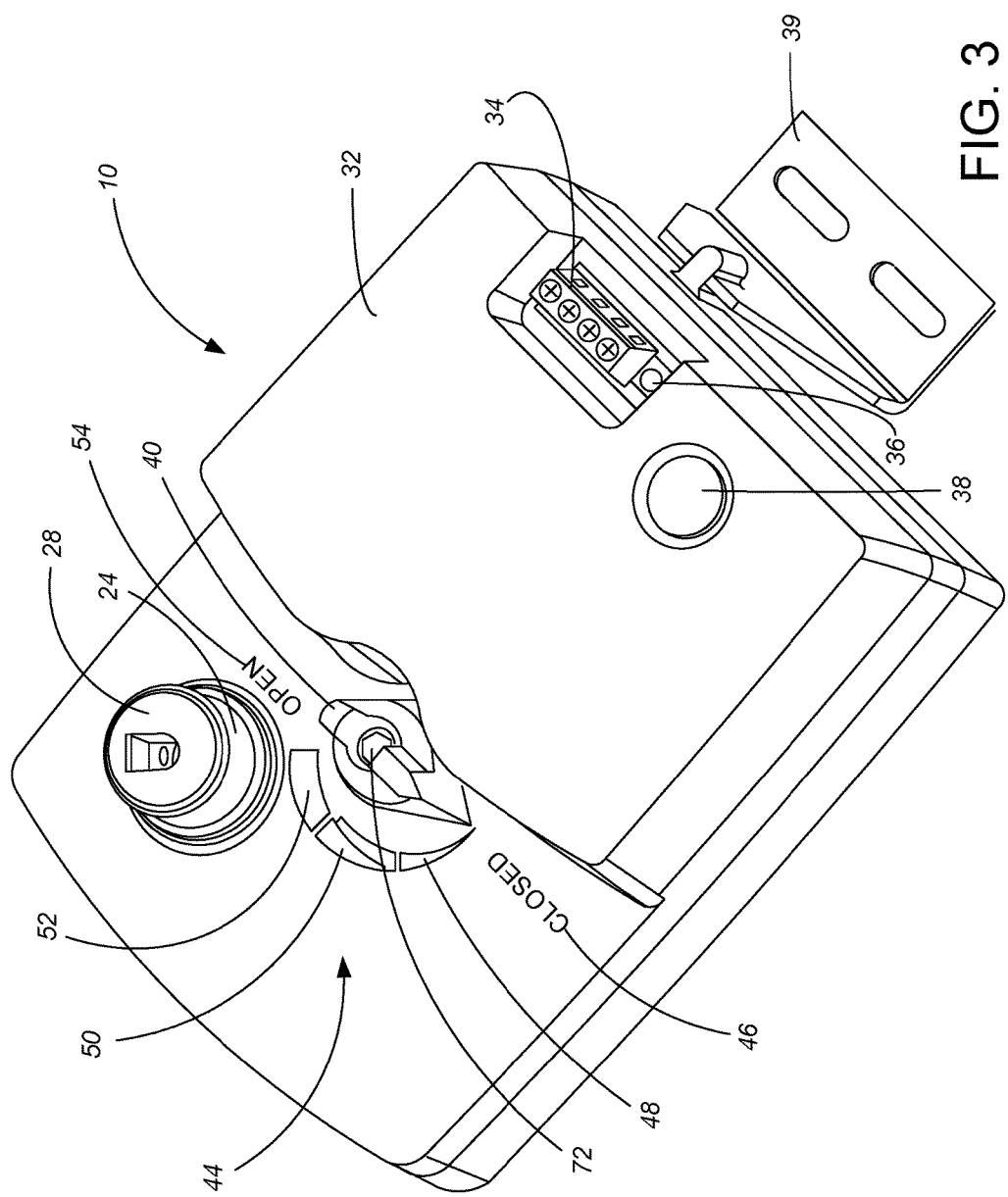
FIG. 3 is a second perspective view of the preferred actuator of FIG. 1 within its enclosure, showing one potential mounting arrangement.

As better shown in FIGS. 2 and 3, in addition to having the upper and lower output drives 22, 24 accessible on the outside of the actuator housing 32, the preferred actuator 10 has several additional components extending outside the housing 32. As is well known in association with HVAC actuators, the actuator 10 includes a terminal block 34 accessible on the outside of the housing 32 for electrical connections. For instance, the terminal block 34 in the preferred embodiment shown includes four electrical connections, IN and OUT for the control signal and COM and 24V for the power supply commonly available in HVAC systems. Any other electrical connections can alternatively be made as known in the actuator art. The preferred embodiment also includes an auto-calibrate switch 36 (electrical switch), and a gear disengagement button 38 (mechanical switch). Other or alternative electrical and mechanical controls can be provided on the housing exterior as known in the actuator art. A mounting bracket 39 or similar hardware may be affixed to the housing 32 to assist in mounting the actuator 10 at the desired location relative to the damper or valve in the field.

Figure 4:
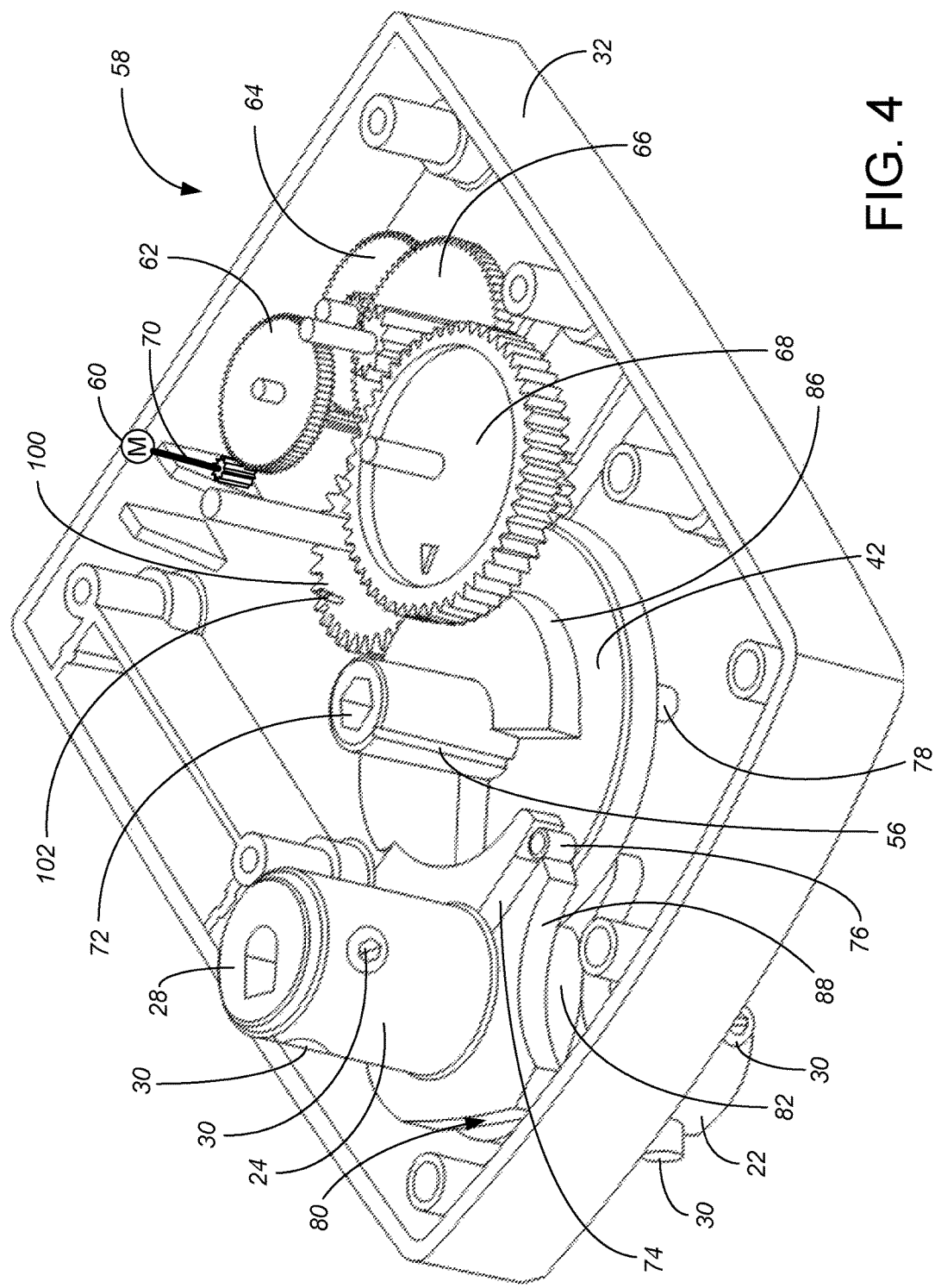
FIG. 4 is a perspective view of the preferred actuator with the cover and circuit board removed, showing the gear train with a peg of the final drive gear in one of the Geneva drive slots.
Figure 15:
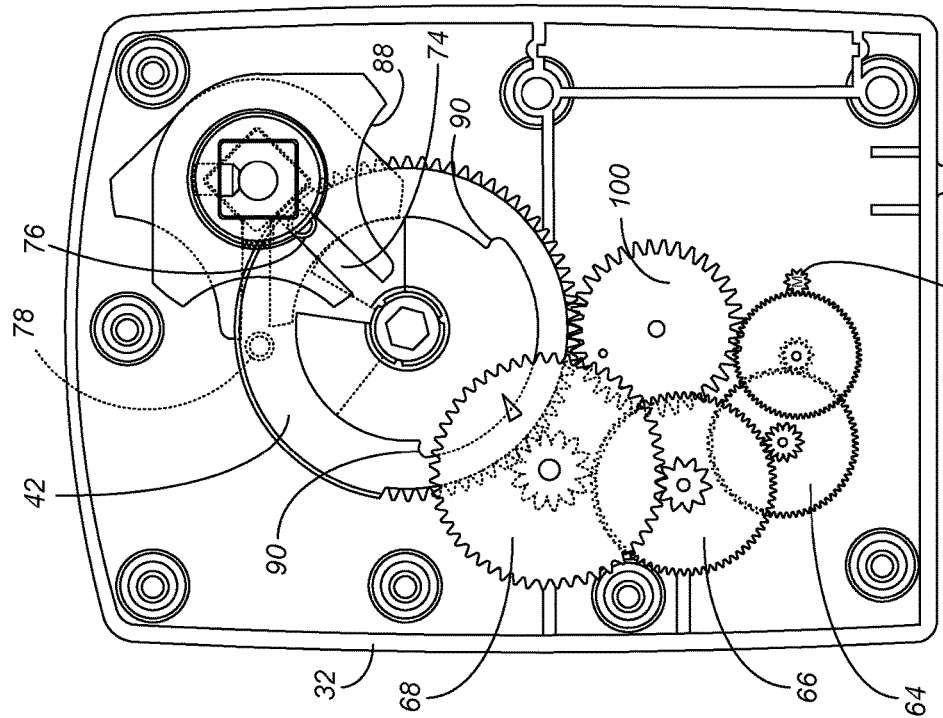
FIG. 15 is a top plan view of the gear train similar to FIG. 14, but with the upper Geneva drive partially opened with the lower Geneva drive fully closed.

A finger pointer or indicator dial 40 is provided in the center of the top face on the outside of the actuator housing 32. The pointer 40 shows the operator where the main drive gear 42 is relative to its total throw. In the preferred embodiment, the indicator dial 40 is read via indicator indicia 44 printed on the housing 32. The indicator indicia 44 preferably include separate markings so the user can readily appreciate the position of each of the outputs 22, 24 with a quick glance. In this preferred situation, the indicator indicia 44 includes a fully closed position 46, a first section 48 where only one of the outputs 24 (plate 14) is opening, a second section 50 where both of the outputs 22, 24 (both plates 12 and 14) are opening, and a third section 52 where the first output 24 to open (plate 14) is fully opened but the second output 22 (plate 12) is completing its stroke and further opening, all the way to a fully open position 54. The preferred indicator dial 40 is mounted on the final drive gear 42 with a snap fit using recesses 56 best shown in FIGS. 5 and 6. In the preferred embodiment, the gear/drive train layout has the main drive gear 42 centered right to left in the actuator housing 32, thereby also centering the pointer 40 to an aesthetically pleasing, balanced location. The gear train 58 transfers torque from the motor 60 to the main drive gear 42 as known in the actuator art, in this example from an initial gear 62 and through a first intermediate gear 64, a second intermediate gear 66 and a third intermediate gear 68. The motor 60 (schematically shown in FIGS. 4 and 14) is selectively powered by an electrical control signal to provide a rotational torque on a motor output shaft 70 driving the initial gear 62. The ratios between number of gear teeth on each of the gears 62, 64, 66, 68, 42 determines how fast each gear rotates relative to the speed of the motor 60, with the depicted gear train 58 significantly decreasing the rotational speed and increasing the torque of the main drive gear 42 relative to the rotational speed and torque of the motor shaft 70.

The final drive gear 42 also has a ¼ inch allen head recess 72 accessible through the indicator dial 40 on the outside of the housing 32. When the gear disengagement button 38 is depressed, one of the gears 64 in the gear train 58 (shown in FIGS. 4 and 14-17) disengages from the others, allowing the operator with an allen wrench (not shown) to rotate the main drive gear 42 without rotating the motor shaft 70. This makes installation easier in the various positions the actuator 10 may be mounted in the field.

As better understood with reference to FIGS. 4-17, the actuator design uses the "Geneva drive" or "Geneva gear" concept, sometimes also referred to as a "Maltese cross gear", but only using a single slot as compared to the four slots of common Geneva drives. Each Geneva output 22, 24 has at least one slot 74, which mates with a projection such as a pin, post or peg 76, 78 on the final drive gear 42, one peg 76 on the top face of the final drive gear 42 and one peg 78 on the bottom face of the final drive gear 42. With the two outputs 22, 24 coaxially arranged as in the preferred embodiment, the two pegs 76, 78 are positioned an angle θ apart on the final drive gear 42. Each peg 76, 78 slides within its appropriate slot 74 on its Geneva gear wheel 22, 24 during only a portion of the throw of the final drive gear 42, so rotation of the final drive gear 42 causes rotation of each Geneva output 22, 24 during only a portion of the throw. In the preferred embodiment with the main drive gear 42 being roughly the same size as the Geneva outputs 22, 24, a 90° rotation of the final drive gear 42 with the peg 76, 78 in the slot 74 turns the corresponding Geneva gear wheel 22, 24 about 90°. During rotation of the final drive gear 42 with the corresponding peg 76, 78 outside its slot 74, the Geneva gear wheel 22, 24 is held stationary, i.e., a 180° rotation of the final drive gear 42 from the fully closed terminal position to the fully closed terminal position first turns upper Geneva gear wheel 24 about 90° and then turns the lower Geneva gear wheel 22 about 90°.

In the preferred embodiment shown, two copies of the identical Geneva gear wheel 22, 24 can be used in an axially aligned position, one on each side of the final drive gear 42. A shaft connector 80 and hub 82 are merely for ease of assembly and support.

The main drive gear 42 can be moved in the actuator 10 a total throw between the fully open terminal position and the fully closed terminal position of less than a 360° rotation, such as a 180° or less movement about its axis 84. The preferred embodiment shown has a total main drive gear throw of about 141.5°. When the peg 76, 78 on the final gear 42 disengages from the respective Geneva gear wheel 22, 24, the output position is locked by the mating curved surfaces 86 of the output gear 42 and the scallops 88 of the Geneva gear wheel 22, 24. Starting from a position where both dampers 12, 14 are closed, the Geneva gear wheel 24 secured to the inner damper shaft 18 enables the actuator 10 to drive the inner damper 14 90° to its fully open position while the associated the final drive gear peg 76 is in the slot 74 of the upper Geneva gear wheel 24. This Geneva gear wheel 24 secured to the inner damper shaft 18 is then locked in position when the peg 76 disengages from the Geneva gear wheel slot 74 by the mating of the curved surface 86 on the top face of the output gear 42 and the scallop 88. Well after the inner damper 14 has begun opening, the other peg 78 on the opposing face of the final drive gear 42 engages the slot 74 on the Geneva gear wheel 22 secured to the outer/lower damper shaft 20 and drives the larger outer damper 12 to the open position.

Each Geneva output 22, 24 has at least one and more preferably two scallops 88 adjacent the slot 74 being used, which fits around a cylindrical portion 86 of the final drive gear 42. The scallop mating prevents the Geneva output 22, 24 from rotating whenever the associated peg 76, 78 is not within the slot 74. The main drive gear 42 includes cylindrically curved walls 86 on its top and bottom face, which cylindrical walls 86 mate into the scallops 88 of the Geneva gears 22, 24, best called out in FIGS. 5, 6, and 8. In the preferred main drive gear 42, a 1.5 inch diameter section 86 mates into the scallops 88 of the Geneva gears 22, 24 to prevent the Geneva gears 22, 24 from unintended rotation.

Figure 14:
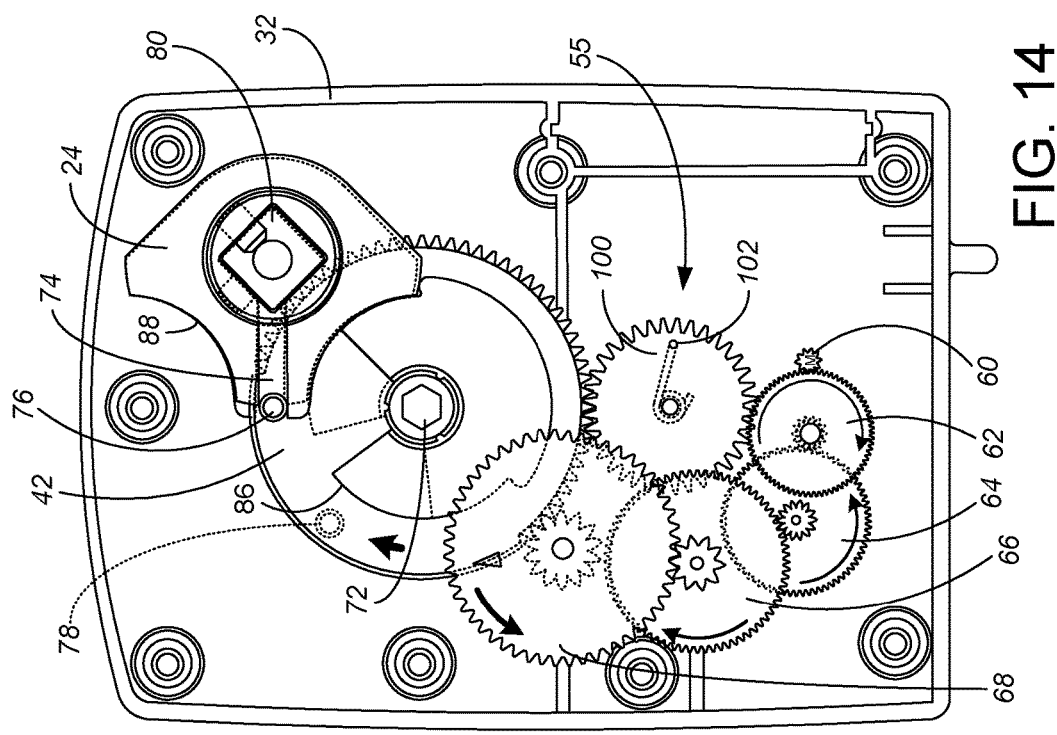
FIG. 14 is a simplified top plan view of the gear train of the preferred actuator within the enclosure bottom, at a fully closed position, with arrows to conceptually indicate the relative power/rotational speed of each of the gears.
Figure 17:
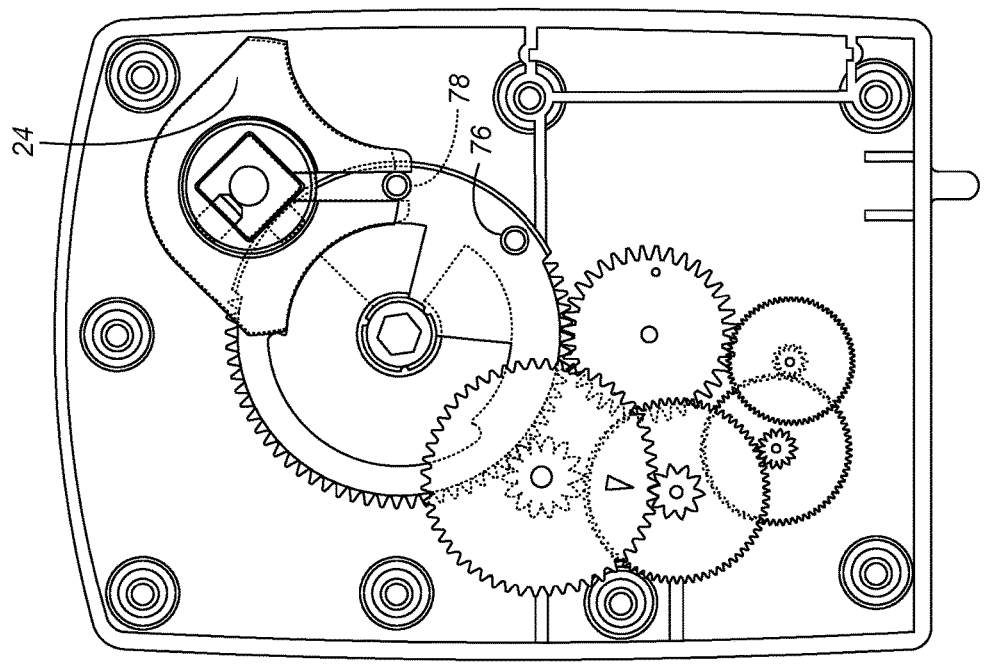
FIG. 17 is a top plan view of the gear train similar to FIGS. 14-16, but with both Geneva drives fully opened.
Figure 16:
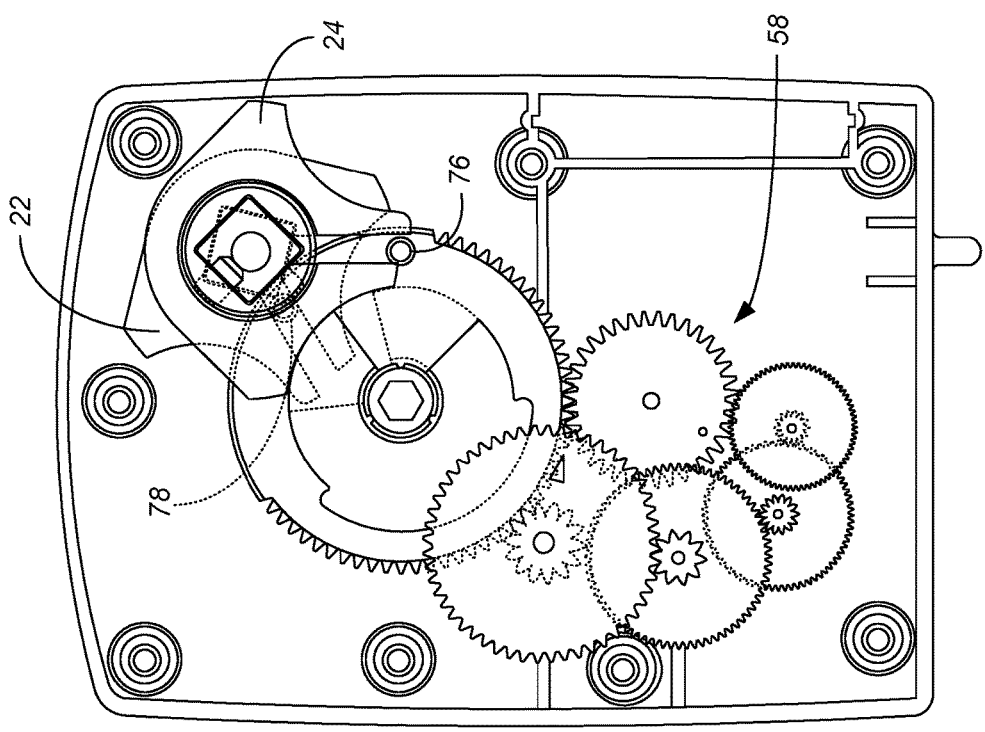
FIG. 16 is a top plan view of the gear train similar to FIGS. 14 and 15, but with the upper Geneva drive fully opened with the lower Geneva drive partially opened.

Another, wider section (in the preferred embodiment, having a radius of about ⅞ inches) provides a stall shoulder 90 at each end of the 1.5 inch diameter curved wall 86. When this shoulder 90 contacts the Geneva gear 22, 24 (as shown in FIGS. 14 and 17) at the end of each opening/closing stroke, no further rotation is possible. Thus, the wider shoulder 90 creates a natural and positive interference stall point for the motor 60 of the actuator 10 when the motor/actuator has completed its throw in either direction.

The final drive gear 42 is stopped when 90° rotation of both Geneva gear wheels 22, 24 is attained. From the open position, the dampers 12, 14 can be driven closed in reverse order (larger/outer damper 12 first) by reversing the direction of the final drive gear 42. The two Geneva gear wheels 22, 24 thus allow the actuator 10 to drive the two shafts 18, 20 each 90° to fully open (the small inner damper 14 first and then the large outer damper 12) and reverse for 90° to close the two dampers 12, 14 in sequence (large outer damper first 12 and then the small inner damper 14).

In general and as called out in FIGS. 10-13, the slot 74 of the preferred Geneva output 22, 24 is linear and extends in a radial direction relative to rotation about its axis 92. Alternatively, the slot 74 could have be at an angle to its radial direction or have a curvature, which would change the rotational translation function of the main drive gear 42 to the Geneva output 22, 24 (i.e., change the shape of the curves shown in FIGS. 18 and 19) from being nearly sinusoidal and balanced to having a modified unbalanced shape.

The slot 74 is defined between a first radially extending wall 94 and a second radially extending wall 96 on the Geneva output 22, 24. In the preferred embodiment, the first (left, as shown in FIG. 11) radially extending wall 94 is slightly longer than the second radially extending wall 96. The first radially extending wall 94 includes a sloped entry portion 98, in the preferred embodiment being at a slope of about 3° for a length of about ¼ inch before becoming parallel to the second radially extending wall 96. When the actuator 10 moves off from a fully opened or fully closed position, the torque transfer from the main drive gear 42 always initially occurs by a peg 76, 78 bearing against the sloped entry portion 98 of one of the Geneva outputs 22, 24, i.e., the sloped entry portion 98 acts as a strike plate where the peg 76, 78 initially contacts the two Geneva drives 22, 24 to begin motion. Having the first radially extending wall 94 be slightly longer with a sloped entry portion 98 assists in the startup of the motor/actuator away from the fully opened or fully closed position, which coincides with the position that the damper or valve is likely to require the greatest torque to begin its throw, and thereby causes less motor wear and tear and a smoother, non-binding operation of the actuator 10 for a longer period of time.

The current actuator design uses a brushless DC motor 60 (shown schematically in FIGS. 4 and 14) to drive the gear train 58. A small circuit board (not shown) with firmware in a microprocessor is used to control the motor's direction, speed and torque. Using a brushless DC motor also gives the microprocessor position feedback of the motor 60 without any external switches or other method.

The preferred actuator 10 also includes a rider gear 100 which is spring biased by a spring 102. The force of this spring 102 on the gear train 58 eliminates gear back lash when reversing direction.

The relative sizes of the flow control members 12, 14 allow the flow through the damper to be capable of supporting/controlling very different flow rate curves. For instance, if the inner flow control member 14 is small, the initial movement of the final gear 42 will allow fine control over a small flow of air in the duct 16, while the later additional movement of the final gear 42 allows coarse control to a fully open flow through the duct 16. The present invention thus allows more sensitive control as desired through the duct 16. The actuator 10 can be similarly used to move first and second flow control members of a valve to control liquid flow through a pipe rather than flow of air or another gas through a duct.

Figure 18:
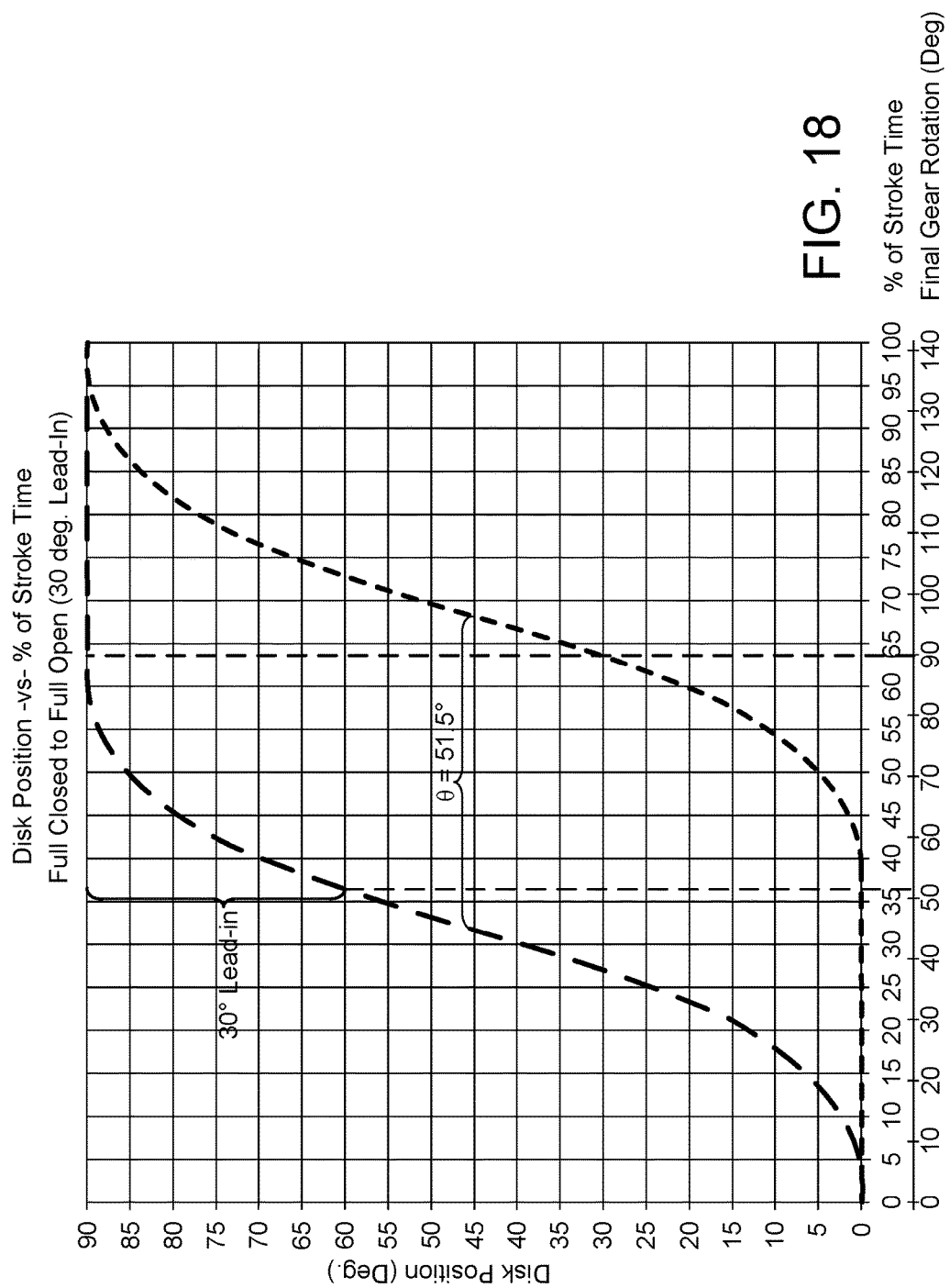
FIG. 18 is a plot of the disk positions versus percentage of stroke for the preferred embodiment actuator.

In the preferred embodiment, the offset angle θ of the positions of the two pegs 76, 78 on the main drive gear 42, and the corresponding position of the curved surfaces 86, is 51.5°, called out in FIG. 6. The bottom Geneva drive 22 interacts with the bottom peg 78 to begin its movement when the upper peg 76 has moved 51.5° through its engagement of the upper Geneva drive 24. The result of this offset angle θ is seen in the progression of FIGS. 14-17, and better understood with reference to the plot of FIG. 18. FIG. 18 separately shows the nearly sinusoidal translation between main drive gear rotation and rotation of the mating Geneva gears 22, 24. The nearly sinusoidal translation is caused by the way the peg 76, 78 rides in its corresponding slot 74 in the Geneva gears 22, 24. When the peg 76 first enters the Geneva gear slot 74 (i.e., in the position shown in FIG. 14), movement of the main drive gear 42 only slightly begins to move the upper Geneva gear 24. As the movement of the main drive gear 42 continues to a position that the peg 76 is directly between the axis 84 of the main drive gear 42 and the axis 92 of the Geneva gear 24 (i.e., in the position shown in FIG. 15), the relative movement/speed of the upper Geneva gear 24 (and its attached damper disk 14) increases to its maximum relative velocity. As the movement of the main drive gear 42 further continues to a position where the peg 76 exits the slot 74 of the upper Geneva gear 24 (i.e., in the position shown in FIG. 16), the relative movement/speed of the upper Geneva gear 24 (and its attached damper disk 14) decreases until stopping. At the same time, the relative movement/speed of the lower Geneva gear 22 increases to its maximum relative velocity. With the upper Geneva gear 24 stopped, the lower Geneva gear 22 continues its throw until the peg 78 exits the slot 74 of the lower Geneva gear 22 (i.e., in the position shown in FIG. 17). Of course, all of this movement is subject to the control of the motor 60 and the control electronics of the actuator 10, and can be stopped or reversed at any desired amount of completion of the total throw.

The plot of FIG. 18 shows the relative movement/translation of both Geneva gears 22, 24. As called out in FIG. 18, the design of the actuator 10 of FIGS. 4-17 with the 51.5° offset has the outer damper disk 12 begin its movement when the inner damper disk 14 has completed 60° of movement, i.e., when the main drive gear 42 has rotated an additional 51.5° from the point that peg 76 first contacted the upper Geneva gear slot 74. The flow through the inner damper area and the flow through the outer damper area are additive to result in the overall flow through the duct 16. By adding the flow when the larger damper 12 begins to open and when the smaller damper 14 is nearly fully opened (i.e., adding both flow curves shown in FIG. 18), there is a smoother flow transition when the larger damper 12 begins to open, and a more linear overall profile to the flow through the duct 16.

Figure 19:
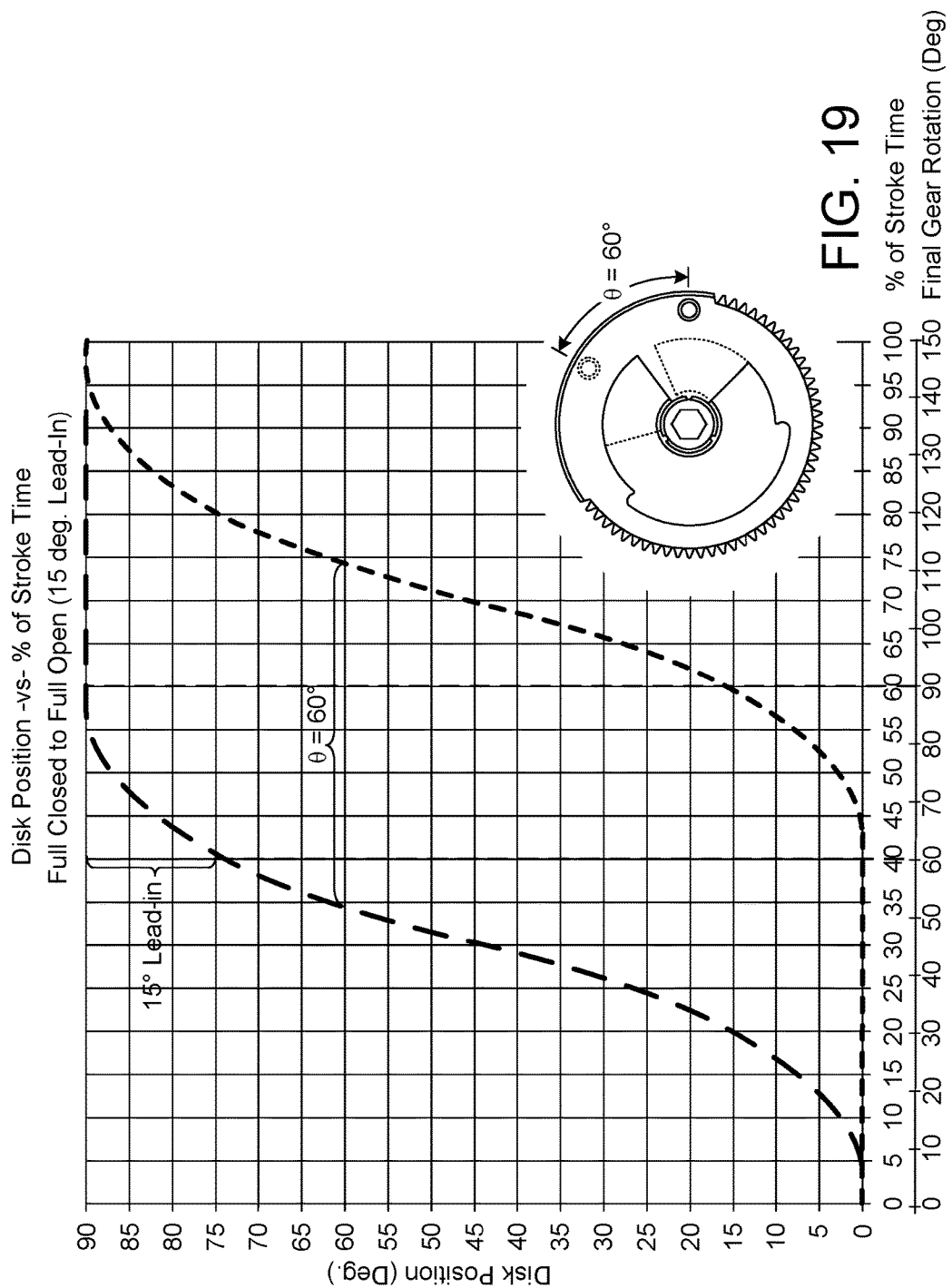
FIG. 19 is a plan view of an alternative final drive gear layout, together with its plot of the disk positions versus percentage of stroke.

FIG. 19 represents a second embodiment. In the second embodiment, the pegs 76, 78 on the top and bottom of the main drive gear 42 are offset by an angle θ of 60°, designed to have the outer damper disk 12 begin its movement when the inner damper disk 14 has completed 75° of movement.

In a third embodiment, the offset angle θ between the peg on top and the peg on bottom of the main drive gear 42 is 90°, in which the inner damper disk 14 completes its stroke from closed to fully opened before the outer damper disk 12 begins its stroke from closed to fully opened.

Workers skilled in the art will understand that, by using plots such as FIGS. 18 and 19, it is straightforward to determine the value of the offset angle θ between top and bottom pegs 76, 78 of the main drive gear 42 to use in the design of the final drive gear 42 to achieve any desired starting point for the one damper disk relative to the amount of opening of the other damper disk. As yet another embodiment, instead of manufacturing the final drive gear 42 as a single molded part with a set offset angle θ between the top peg 76 and the bottom peg 78, the final drive gear 42 could be manufactured as two molded parts (a top half and a bottom half) mating together frictionally or in a toothed arrangement only when the actuator 10 is fully assembled with the cover on, so the offset angle θ is changeable during assembly, such that the determination of when the one damper disk begins its movement relative to the other damper disk could be selected/changed in the field rather than solely selected at manufacturing.

The actuator design of the present invention is thus able to independently drive two shafts 18, 20 of a dual damper or dual valve, using a design which is simple to manufacture and assemble and robust to withstand years of field use. Although the present invention has been described with reference to preferred embodiments, workers skilled in the art will recognize that changes may be made in form and detail without departing from the spirit and scope of the invention.

The invention claimed is:
1. An HVAC actuator for use in opening and closing a valve or a damper to control fluid flow in an HVAC system in a two step control, the actuator comprising:
   a motor which can be selectively powered to provide a rotational torque on a motor output shaft;
   a gear train rotationally coupled to the motor output shaft, the gear train having a final gear rotatable about a final gear axis and having a first face perpendicular to the final gear axis, with a first projection on the first face of the final gear, wherein the motor can drive the final gear in either a forward or reverse direction for a throw between a fully open terminal position and a fully closed terminal position;
   a first output member rotationally coupled to the final gear by having a first output slot which receives the first projection during only a portion of the throw, so during the portion of the throw that the first projection is in the first output slot the final gear rotates the first output member and, during another portion of the throw that the first projection is not in the first output slot, rotation of the final gear does not rotate the first output member; and
   a second output member rotationally coupled to the final gear so the second output member is rotationally driven by the final gear during the portion of the throw that the first projection is not in the first output slot.
2. The actuator of claim 1, wherein the first output member and the second output member rotate coaxially.

3. The actuator of claim 2, wherein the at least one of the first output member and the second output member comprise an axial through-bore 26, such that the actuator can be used to drive coaxially arranged drive stems of the valve or damper, with one of the drive stems extending through the axial through-bore 26 for control by the other of the first output member and the second output member.

4. The actuator of claim 1, wherein the final gear has a second face perpendicular to the final gear axis, the second face opposing the first face, and wherein the final gear has a second projection on the second face, wherein the second output member is rotationally coupled to the final gear by having a second output slot which receives the second projection during only a portion of the throw, so during the portion of the throw that the second projection is in the second output slot the final gear rotates the second output member.

5. The actuator of claim 4, wherein the first output member and the second output member are identically shaped.

6. The actuator of claim 1, wherein the complete throw between the fully open terminal position and the fully closed terminal position is less than a 360° rotation of the final gear.

7. The actuator of claim 6, wherein the complete throw between the fully open terminal position and the fully closed terminal position is greater than a 135° rotation of the final gear, and wherein the complete throw between the fully open terminal position and the fully closed terminal position causes a rotation of the first output member of about 90° and a rotation of the second output member of about 90°.

8. The actuator of claim 1, wherein the final gear comprises a first wall on its first face having a portion which is cylindrical about the final gear axis, and wherein the first output member comprises an arcuate scallop mating with the first wall such that the first wall prevents the first output member from rotating during a portion of the throw wherein the first projection is not in the first output slot.

9. The actuator of claim 8,
wherein the final gear has a second face perpendicular to the final gear axis, the second face opposing the first face, and wherein the final gear has a second projection on the second face, wherein the second output member is rotationally coupled to the final gear by having a second output slot which receives the second projection during only a portion of the throw, so during the portion of the throw that the second projection is in the second output slot the final gear rotates the second output member; and
wherein the final gear comprises a second wall on its second face having a portion which is cylindrical about the final gear axis, and wherein the second output member comprises an arcuate stop mating with the second wall such that the second wall prevents the second output member from rotating during a portion of the throw wherein the second projection is not in the second output slot.

10. The actuator of claim 1, wherein second output member rotationally coupled to the final gear so the second output member is also rotationally driven by the final gear during a portion of the throw that the first projection is in the first output slot.

11. The actuator of claim 1, wherein the slot is linear and extends in a radial direction relative to rotation of the first output member.

12. The actuator of claim 11, wherein the slot is defined between a first radially extending wall and a second radially extending wall on the first output member, and wherein the first radially extending wall is longer than the second radially extending wall.

13. The actuator of claim 12, wherein the first radially extending wall includes a sloped entry portion.

14. The actuator of claim 1, wherein the final gear comprises a stall shoulder which contacts the first output member at one of the fully open terminal position and the fully closed terminal position, the stall shoulder creating a positive interference stall point for the motor of the actuator when the actuator has completed its throw.

15. The actuator of claim 1, further comprising:
a housing containing the motor and gear train; and
a pointer on the outside of the housing to show where the final gear is relative to its total throw.

16. The actuator of claim 1, wherein the gear train comprises at least one intermediate gear, and further comprising a spring on the intermediate gear, with spring force reducing gear lash back when reversing direction.

17. A flow control device for controlling fluid flow through a duct or pipe, comprising:
a first flow blockage plate having its position for blocking flow in the duct or pipe controlled by a rotational shaft;
a second flow blockage plate having its position for blocking flow in the duct or pipe controlled by a rotational sleeve coaxially disposed on the shaft;
each of the first flow blockage plate and the second flow blockage plate in a closed position blocking separate portions of the cross-sectional flow area through the flow control device; and
an actuator for use in rotating both the shaft and the sleeve, the actuator comprising:
a motor which can be selectively powered to provide a rotational torque on a motor output shaft;
a gear train rotationally coupled to the motor output shaft, the gear train having a final gear rotatable about a final gear axis and having a first face perpendicular to the final gear axis, with a first projection on the first face of the final gear, wherein the motor can drive the final gear in either a forward or reverse direction for a throw between a fully open terminal position and a fully closed terminal position;
a first output member rotationally coupled to the final gear by having a first output slot which receives the first projection during only a portion of the throw, so during the portion of the throw that the first projection is in the first output slot the final gear rotates the first output member and, during another portion of the throw that the first projection is not in the first output slot, rotation of the final gear does not rotate the first output member, the first output member being secured to one of the shaft and sleeve; and
a second output member rotationally coupled to the final gear so the second output member is rotationally driven by the final gear during the portion of the throw that the first projection is not in the first output slot, the second output member being secured to the other of the shaft and sleeve.

18. The flow control device of claim 17 in an HVAC system as a damper using the first flow blockage plate and the second flow blockage plate to control air flow through a duct.

* * * * *